US012803450B2

(12) United States Patent
Peng et al.

(10) Patent No.: US 12,803,450 B2
(45) Date of Patent: Nov. 17, 2026

(54) ACTIVE CLAMPING VOLTAGE CONVERSION CIRCUIT AND CONTROLLER THEREOF

(71) Applicant: Chicony Power Technology Co., Ltd., New Taipei City (TW)

(72) Inventors: Tso-Jen Peng, New Taipei City (TW); Mao-Song Pan, New Taipei City (TW); Ke-Cheng Chen, New Taipei City (TW)

(73) Assignee: CHICONY POWER TECHNOLOGY CO., LTD., New Taipei City (TW)

( * ) Notice: Subject to any disclaimer, the term of this patent is extended or adjusted under 35 U.S.C. 154(b) by 99 days.

(21) Appl. No.: 19/083,072

(22) Filed: Mar. 18, 2025

(65) Prior Publication Data

US 2026/0205016 A1 Jul. 16, 2026

(30) Foreign Application Priority Data

Jan. 13, 2025 (TW) ................................ 114101376

(51) Int. Cl.
*H02M 3/335* (2006.01)
*H02M 1/00* (2006.01)
(Continued)

(52) U.S. Cl.
CPC ..... *H02M 3/33569* (2013.01); *H02M 1/0009* (2021.05); *H02M 1/0054* (2021.05); *H02M 1/342* (2021.05); *H02M 1/38* (2013.01)

(58) Field of Classification Search
CPC .. H02M 1/0009; H02M 1/0058; H02M 1/342; H02M 1/38; H02M 3/335; H02M 3/33569
See application file for complete search history.

(56) References Cited

U.S. PATENT DOCUMENTS 8,339,813 B2 12/2012 Wang et al.
8,964,413 B2 2/2015 Liu
(Continued)

FOREIGN PATENT DOCUMENTS

CN 112117905 B 12/2021
CN 114204817 A 3/2022
(Continued)

*Primary Examiner* — Gary L Laxton
(74) *Attorney, Agent, or Firm* — Birch, Stewart, Kolasch & Birch, LLP

(57) ABSTRACT

An active clamping voltage conversion circuit and a controller thereof. The active clamping voltage conversion circuit includes a switching power supply circuit, an active clamping circuit, a current sensor, a PWM controller, and a positive-negative voltage controller. The switching power supply circuit includes a transformer and a first switch. The first switch is coupled to a main ground end of the transformer. The active clamping circuit includes a second switch. The current sensor is coupled between the main ground end and the second switch to generate a current detection signal. The current detection signal indicates the current flowing through the second switch. The PWM controller generates a PWM signal to the first switch, causing the first switch to perform switching operations. The positive-negative voltage controller selectively outputs a negative-voltage to the second switch according to the current detection signal during a dead time between the first switch and second switch.

14 Claims, 6 Drawing Sheets

(51) Int. Cl.
*H02M 1/34* (2007.01)
*H02M 1/38* (2007.01)

(56) References Cited

U.S. PATENT DOCUMENTS

| | | | | |
|---|---|---|---|---|
| 9,119,274 | B2 | 8/2015 | Pawellek et al. | |
| 9,793,260 | B2 | 10/2017 | Zojer et al. | |
| 10,103,616 | B1 * | 10/2018 | Lin | H02M 1/083 |
| 10,170,974 | B1 | 1/2019 | Oh et al. | |
| 2005/0073861 | A1 * | 4/2005 | Ke | H02M 3/33569 363/20 |
| 2022/0069718 | A1 * | 3/2022 | Xu | H02M 1/38 |
| 2023/0261580 | A1 | 8/2023 | Chiu et al. | |

FOREIGN PATENT DOCUMENTS

| | | | |
|---|---|---|---|
| CN | 115036896 | A | 9/2022 |
| TW | 201735518 | A | 10/2017 |
| TW | 202013864 | A | 4/2020 |
| TW | 202201891 | A | 1/2022 |
| TW | 202312644 | A | 3/2023 |
| TW | 202322536 | A | 6/2023 |
| TW | 202337124 | A | 9/2023 |
| TW | M663361 | U | 11/2024 |

* cited by examiner

ACTIVE CLAMPING VOLTAGE CONVERSION CIRCUIT AND CONTROLLER THEREOF

CROSS-REFERENCE TO RELATED APPLICATION

This non-provisional application claims priority under 35 U.S.C. § 119(a) to Patent Application No. 114101376 filed in Taiwan, R.O.C. on Jan. 13, 2025, the entire contents of which are hereby incorporated by reference.

BACKGROUND

Technical Field

The present invention provides a voltage conversion circuit, and particularly relates to an active clamping voltage conversion circuit and a controller thereof.

Related Art

An existing flyback structure is equipped with a CLC resonant circuit on a secondary side. The CLC resonant circuit can pull down the voltage on the secondary side so that excitation energy at a primary side can be transferred more effectively to the secondary side. However, the CLC resonant circuit has electronic components that occupy a considerable amount of space, such as capacitors and inductors, which cannot meet the demands on reduction of product size.

SUMMARY

In view of this, in some embodiments, an active clamping voltage conversion circuit is provided and includes a switching power supply circuit, an active clamping circuit, a current sensor, a PWM controller, and a positive-negative voltage controller. The switching power supply circuit includes a transformer and a first switch. A primary side coil of the transformer has a main power end and a main ground end, and the first switch is coupled to the main ground end of the transformer. The active clamping circuit is coupled in parallel to the primary side coil of the transformer and includes a second switch. The current sensor is coupled between the main ground end of the transformer and the second switch to generate a current detection signal. The current detection signal indicates the current flowing through the second switch. The PWM controller is coupled to the first switch and generates a PWM signal to the first switch, causing the first switch to perform switching operations. The positive-negative voltage controller is coupled to the second switch and the current sensor, and selectively outputs a negative-voltage to the second switch according to the current detection signal during a dead time between the first switch and second switch.

In some embodiments, a controller is provided and configured to: generate the PWM signal to the first switch, causing the first switch to perform switching operations; acquire the current detection signal indicating the current flowing through the second switch; and selectively output the negative-voltage to the second switch according to the current detection signal during the dead time between the first switch and the second switch.

In conclusion, according to the active clamping voltage conversion circuit and a control method thereof in some embodiments of the present invention, the negative-voltage is transferred to the second switch, so that the voltage of the primary side coil is increased, more excitation energy of the primary side coil can be transferred to a secondary side coil, and meanwhile, the excitation energy flowing to a clamping capacitor is reduced so that losses in the energy recycling process can be reduced. Moreover, because the voltage of the primary side coil is increased, it is not needed to additionally arrange a CLC resonant circuit configured to reduce the voltage on the secondary side of the transformer. In this way, the hardware cost and the occupied volume of the CLC resonant circuit can be reduced, and the miniaturization of product is facilitated.

The detailed features and advantages of the present invention are described in detail in embodiments, and the contents are sufficient to those familiar with the relevant skills to understand the technical content of the present invention and implement it correspondingly, and according to the contents disclosed in this specification, the scope of the patent application and the drawings, any person familiar with the relevant skills can easily understand the relevant purposes and advantages of the present invention.

DETAILED DESCRIPTION

Figure 1:
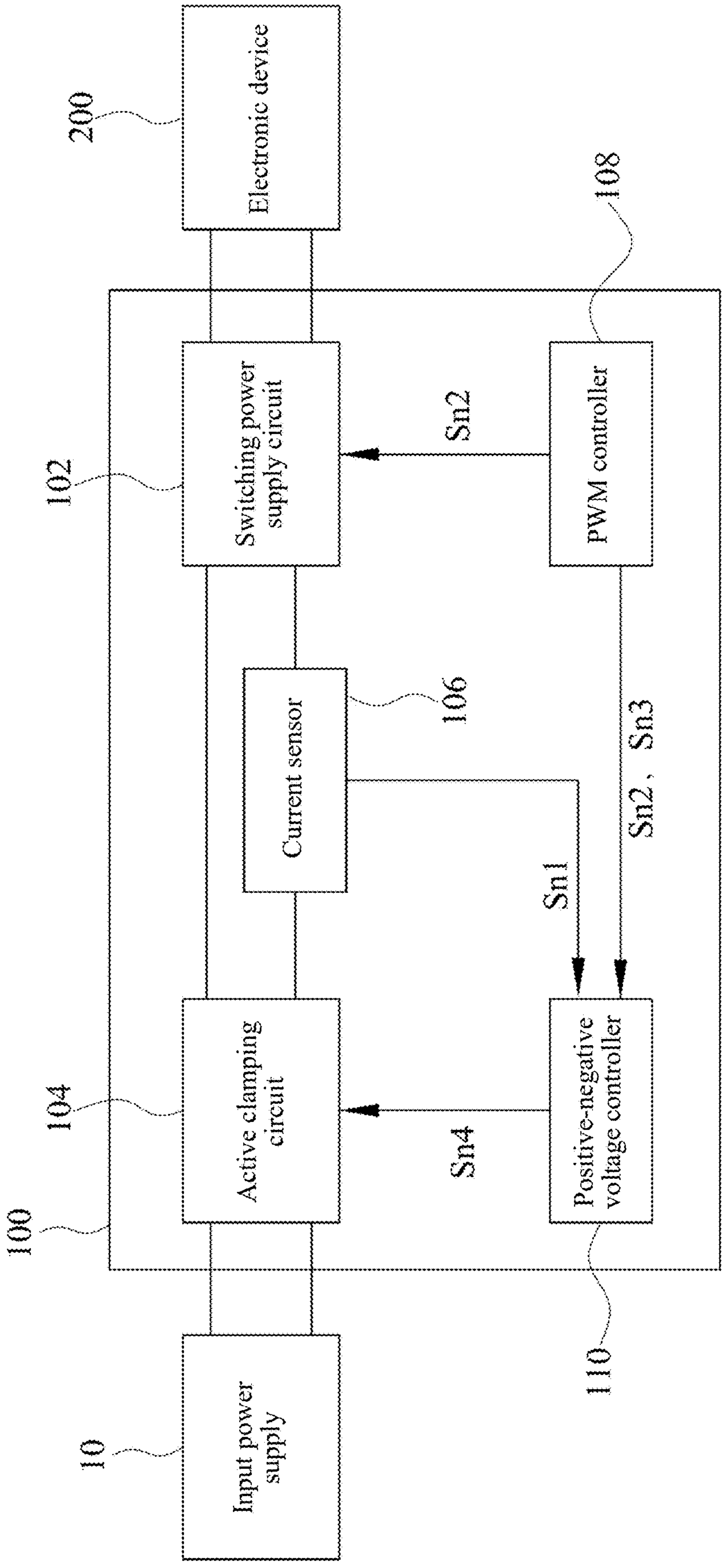
FIG. 1 is a block diagram of an active clamping voltage conversion circuit in some embodiments of the present invention.

Please refer to FIG. 1. An active clamping voltage conversion circuit 100 includes a switching power supply circuit 102, an active clamping circuit 104, a current sensor 106, a PWM controller 108, and a positive-negative voltage controller 110. The switching power supply circuit 102 receives an input voltage provided by an input power supply 10 and generates an output voltage after performing power conversion. For example, the active clamping voltage conversion circuit 100 is coupled to an electronic device 200 to provide the output voltage for the electronic device 200.

The active clamping circuit 104 is connected in parallel to the switching power supply circuit 102 to reduce the switching loss of the switching power supply circuit 102, reduce the voltage stress and improve the power conversion efficiency. The current sensor 106 is coupled between the switching power supply circuit 102 and the active clamping circuit 104 and generates a current detection signal Sn1 for detecting the current flowing from the switching power supply circuit 102 to the active clamping circuit 104. The PWM controller 108 is configured to generate two PWM signals Sn2 and Sn3. The PWM controller 108 is coupled to the switching power supply circuit 102 to output the PWM signal Sn2 to the switching power supply circuit 102 to control the operation of the switching power supply circuit 102. The PWM controller 108 is also coupled to the positive-negative voltage controller 110 to output the two PWM signals Sn2 and Sn3 to the positive-negative voltage controller 110. The positive-negative voltage controller 110 is coupled to the active clamping circuit 104, the current sensor 106 and the PWM controller 108 to receive the two PWM signals Sn2 and Sn3 and the current detection signal Sn1 and output a positive-negative voltage signal Sn4 to control the operation of the active clamping circuit 104 through the positive-negative voltage signal Sn4.

Figure 2:
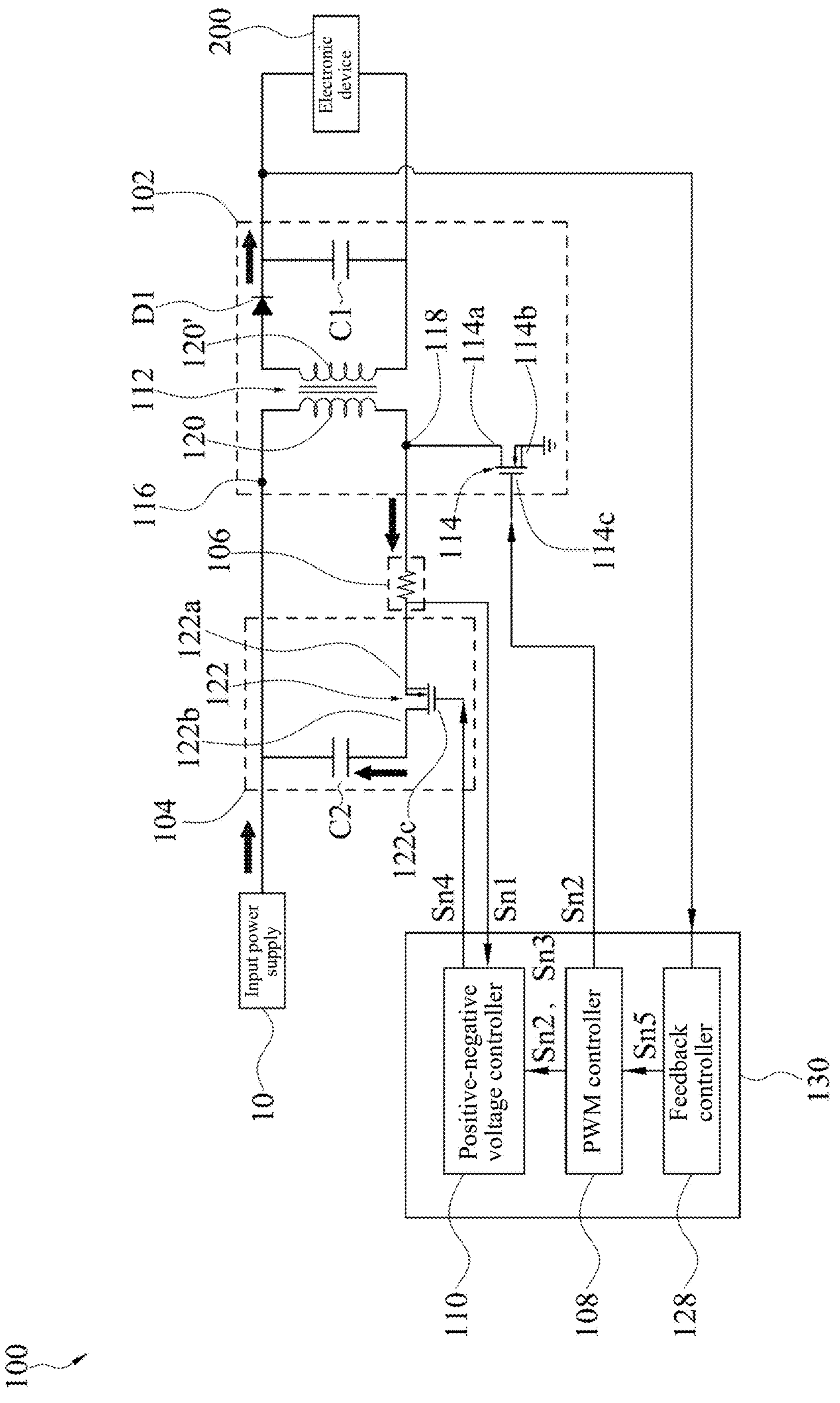
FIG. 2 is a circuit diagram of an active clamping voltage conversion circuit in some embodiments of the present invention.
Figure 3:
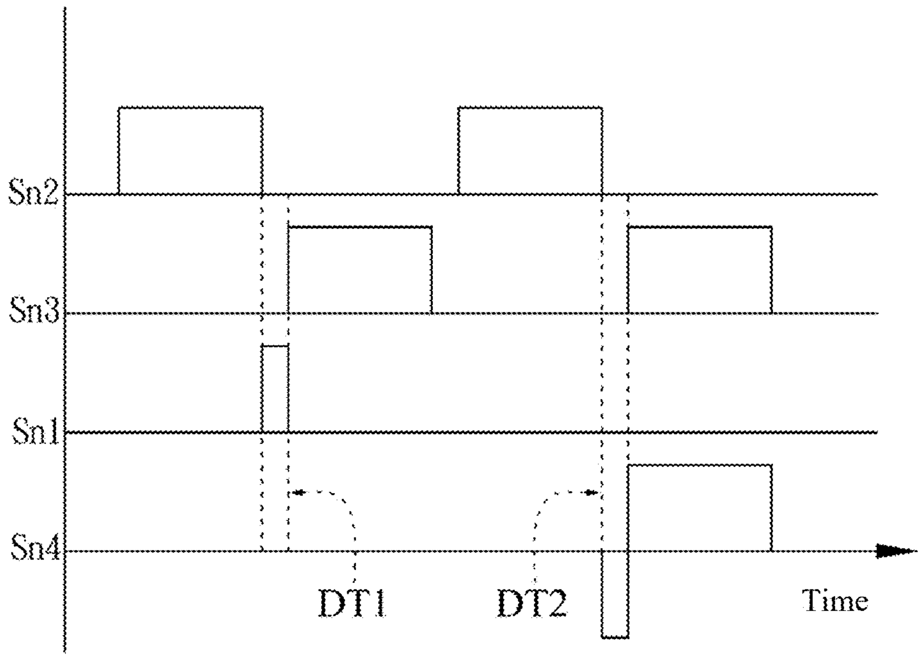
FIG. 3 is a sequence diagram of a first switch and a second switch receiving signals in some embodiments of the present invention.

Please refer to FIG. 2 and FIG. 3. The switching power supply circuit 102 includes a transformer 112 and a first switch 114. The transformer 112 has a primary side coil 120 and a secondary side coil 120'. The primary side coil 120 of the transformer 112 has a main power end 116 and a main ground end 118. The main power end 116 is coupled to the input power supply 10. The first switch 114 is coupled to the main ground end 118 of the transformer 112. The switching power supply circuit 102 takes Flyback converters as an example. Therefore, the switching power supply circuit 102 also includes a diode D1 and an output capacitor C1, an anode of the diode D1 is coupled to the secondary side coil 120' of the transformer 112, and a cathode of the diode D1 is coupled to the output capacitor C1.

In some embodiments, the first switch 114 is a metal-oxide-semiconductor field-effect transistor (MOSFET). The first switch 114 has a first end 114*a*, a second end 114*b*, and a control end 114*c* which are respectively a drain, a source, and a gate. The first end 114*a* is coupled to the main ground end 118, and the second end 114*b* is coupled to the ground. The control end 114*c* is coupled to the PWM controller 108 to receive the PWM signal Sn2 outputted by the PWM controller 108 to determine whether the first switch 114 turns on or turns off. When the PWM signal Sn2 is in a high level, the first switch 114 turns on; and when the PWM signal Sn2 is in a low level, the first switch 114 turns off. In some embodiments, the first switch 114 is a gallium nitride field-effect transistor (GaN FET).

When the first switch 114 turns on, the input power supply 10 transfers current to the primary side coil 120 of the transformer 112 for excitation, and the excitation energy is stored in the primary side coil 120. Meanwhile, the induced voltage of the secondary side coil 120' of the transformer 112 is negative, so that the diode D1 is reversely biased (turns off), and the output voltage is supplied by the output capacitor C1 coupled to the secondary side coil 120'. When the first switch 114 turns off, the excitation energy is coupled to the secondary side coil 120', and the voltage polarity of the secondary side coil 120' is reversed, so that the diode D1 is biased forward (turns on), and then the output voltage is provided for the electronic device 200.

The active clamping circuit 104 is coupled in parallel to the primary side coil 120 of the transformer 112 to absorb the peak voltage generated on the first switch 114 by the leakage inductance of the transformer 112 at the moment the first switch 114 turns off. The active clamping circuit 104 includes a second switch 122 and a clamping capacitor C2. The second switch 122 and the clamping capacitor C2 are connected in series and are coupled between the input power supply 10 and the main ground end 118 of the transformer 112. After the first switch 114 turns off, the second switch 122 turns on, and thereby the leakage inductance energy of the transformer 112 is stored in the clamping capacitor C2.

In some embodiments, the second switch 122 is the GaN FET. The second switch 122 has a first end 122*a*, a second end 122*b*, and a control end 122*c* which are respectively a source, a drain, and a gate. The first end 122*a* is coupled to the main ground end 118 of the transformer 112, and the second end 122*b* is coupled to the clamping capacitor C2. The control end 122*c* is coupled to the positive-negative voltage controller 110 to receive the positive-negative voltage signal Sn4 outputted by the positive-negative voltage controller 110 to determine whether the second switch 122 turns on or turns off. When the positive-negative voltage signal Sn4 corresponds the positive-voltage, the second switch 122 turns on; and when the positive-negative voltage signal Sn4 corresponds negative voltage or zero voltage, the second switch 122 turns off.

Specifically, at the moment the first switch 114 turns off (the PWM signal Sn2 is changed from the high level to the low level), the excitation energy is coupled to the secondary side coil 120', and the energy (leakage inductance energy) which is not coupled to the secondary side coil 120' is also generated at the same time. When the second switch 122 turns on (the positive-negative voltage signal Sn4 corresponds to the positive-voltage), the leakage inductance energy is transferred to the clamping capacitor C2, and the recovered energy can be reused. It is to be noted that due to the characteristic of the GaN FET (compared with a metal oxide semiconductor field effect transistor which has a body diode, the GaN FET lacks the body diode), when a negative-voltage is applied to the control end 122*c* of the second switch 122, the GaN FET is operated in a reverse conduction mode (a third quadrant), and has a forward voltage drop $V_F$ (as shown in Formula 1). $V_{TH\ (GD)}$ is a threshold voltage between the gate and the drain, $V_{GS\ (OFF)}$ is a voltage between the gate and the source in a transistor off state, $I_{SD}$ is a current from the source to the drain, $R_{SD\ (ON)}$ is an equivalent channel resistance, and $V_F$ is in direct proportion to $I_{SD}$. Therefore, the forward voltage drop $V_F$ of the GaN FET operating in the reverse conduction mode improves the voltage of the primary side coil 120 (so that the voltage of the primary side coil 120 is greater than the voltage of the secondary side coil 120'), thereby being conducive to transferring more energy stored by the primary side coil 120 to the secondary side coil 120' (improving the conversion efficiency), and reducing excitation energy flowing to the clamping capacitor C2 (reducing the loss in the energy recovery process).

$$V_F = V_{TH} + V_{GS(OFF)} + I_{SD} * R_{SD(ON)} \quad \text{(Formula 1)}$$

The current sensor 106 is coupled between the main ground end 118 of the transformer 112 and the second switch 122. The current sensor 106 is configured to detect the current (leakage inductance current) flowing from the transformer 112 to the second switch 122 to generate the current detection signal Sn1. That is, the current detection signal Sn1 indicates the value of the current flowing through the second switch 122. The current sensor 106 takes a resistor as an example, and the current detection signal Sn1 may be voltage drop across the resistor.

After the first switch 114 turns off and before the second switch 122 turns on, i.e. within a dead time of the first switch 114 and the second switch 122 (a period when the two both turn off), the positive-negative voltage controller 110 selectively outputs the negative-voltage to the second switch 122 according to the current detection signal Sn1 to transfer more excitation energy to the secondary side coil 120'. In some embodiments, in response to that the current detection signal Sn1 is greater than a threshold, the positive-negative voltage controller 110 outputs the negative-voltage to the control end 122*c* of the second switch 122. As shown in FIG. 3, when the current detection signal Sn1 is determined to be greater than the threshold (taking 0 ampere as an example) during the dead time DT1, the positive-negative voltage controller 110 enables the positive-negative voltage signal Sn4 to correspond to the negative-voltage during the dead time DT2 in the next cycle. Otherwise, the positive-negative voltage controller 110 enables the positive-negative voltage signal Sn4 to correspond to zero voltage during the dead time DT2 in the next cycle.

Figure 4:
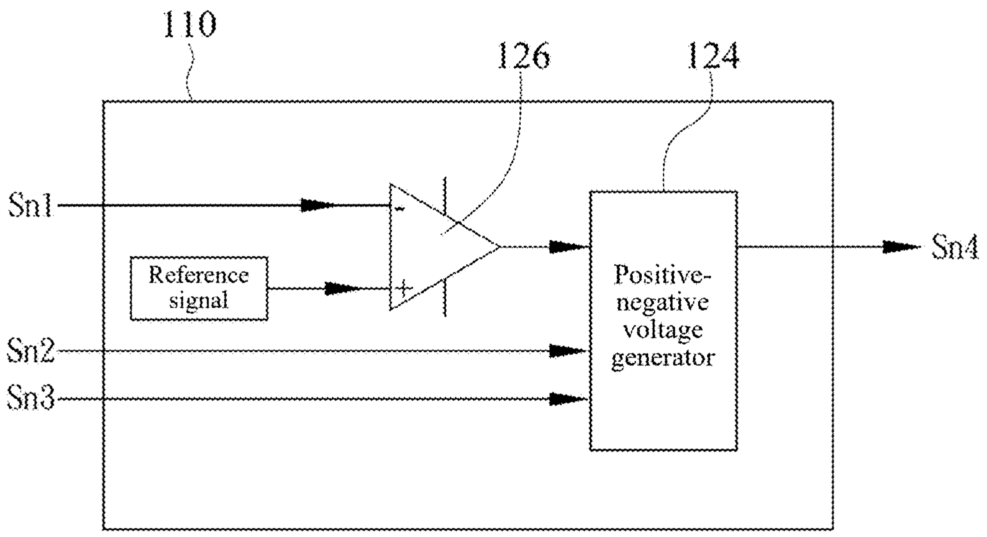
FIG. 4 is a circuit diagram of a positive-negative voltage controller in some embodiments of the present invention.

Please refer to FIG. 4. In some embodiments, the positive-negative voltage controller 110 includes a positive-negative voltage generator 124 and a comparator 126. The positive-negative voltage generator 124 is configured to output the positive-negative voltage signal Sn4. The comparator 126 receives the current detection signal Sn1 and a reference signal respectively to output a comparison result of the current detection signal Sn1 and the reference signal to the positive-negative voltage generator 124. The reference signal is used as the threshold. Therefore, the positive-negative voltage generator 124 selectively generates the negative-voltage according to the comparison result of the current detection signal Sn1 and the reference signal. For example, when the current detection signal Sn1 is greater than the reference signal, the comparator 126 generates a first comparison result, and the positive-negative voltage generator 124 generates the negative-voltage according to the first comparison result. Otherwise, when the reference signal is less than or equal to the reference signal, the comparator 126 generates a second comparison result, and the positive-negative voltage generator 124 generates the zero voltage according to the second comparison result.

The positive-negative voltage generator 124 also receives the PWM signals Sn2 and Sn3 outputted by the PWM controller 108 to obtain dead time points of the first switch 114 and the second switch 122, thereby enabling the negative-voltage to be in the correct dead time when the negative-voltage needs to be generated. In detail, the positive-negative voltage generator 124 can obtain the turn-off time point of the first switch 114 through the PWM signal Sn2, and obtain a preset turn-on time point and a preset turn-off time point of the second switch 122 through the PWM signal Sn3. Therefore, the positive-negative voltage signal Sn4 corresponds high voltage in a period from the preset turn-on time point to the preset turn-off time point of the second switch 122, corresponds to the negative voltage or zero voltage during the dead time, and corresponds the zero voltage during other time (namely the turn-on period of the first switch 114).

In some embodiments, the value of negative-voltage is close to an upper limit of negative voltage tolerance between the gate and the source of the second switch 122, but the present invention is not limited to this. For example, it may be any value of the negative-voltage within the negative voltage tolerance range between the gate and the source of the second switch 122.

In some embodiments, the negative-voltage starts from a start point of dead time DT2. That is, the negative voltage starts when the PWM signal Sn2 is changed from the high level to the low level. However, the present invention is not limited to this. For example, the negative-voltage may only occupy part of the dead time DT2 rather than all the time of the dead time DT2 as shown in FIG. 3. The positive-negative voltage signal Sn4 corresponds zero voltage during a non-negative-voltage period in the dead time DT2.

In some embodiments, the positive-negative voltage controller 110 outputs a positive-voltage after finishing outputting the negative-voltage to turn on the second switch 122 immediately after improving the voltage of the primary side coil 120.

In some embodiments, as shown in FIG. 2, the active clamping voltage conversion circuit 100 further includes a feedback controller 128. The feedback controller 128 is coupled to the output capacitor C1 and the PWM controller 108 and configured to generate a feedback signal Sn5 according to the output voltage, and the feedback signal Sn5 can indicate the value of the output voltage. The PWM controller 108 receives the feedback signal Sn5 to regulate the PWM signals Sn2 and Sn3 according to the output voltage.

In some embodiments, the PWM controller 108, the positive-negative voltage controller 110, and the feedback controller 128 are positioned in a controller 130. The controller 130 is a microcontroller, a digital signal processor (DSP), a field-programmable gate array (FPGA) or an application-specific integrated circuit (ASIC).

Figure 5:
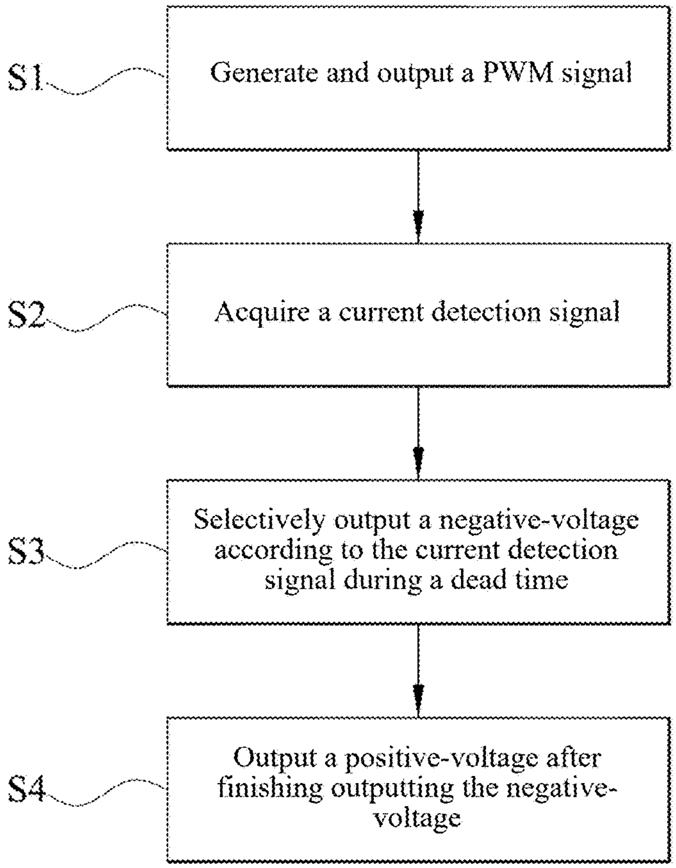
FIG. 5 is a flowchart of a control method of an active clamping voltage conversion circuit in some embodiments of the present invention.

Please refer to FIG. 5. The controller 130 performs a control method of the active clamping voltage conversion circuit 100. The control method includes: generating a PWM signal Sn2 to a first switch 114, causing the first switch 114 to perform switching operations (step S1); acquiring a current detection signal Sn1 indicating the current flowing through a second switch 122 (step S2); selectively outputting a negative-voltage to the second switch 122 according to the current detection signal Sn1 during a dead time of the first switch 114 and the second switch 122 (step S3); and outputting positive-voltage after finishing outputting the negative voltage (step S4). The detailed operations of the steps are described above, and will not be repeated here.

Figure 6A:
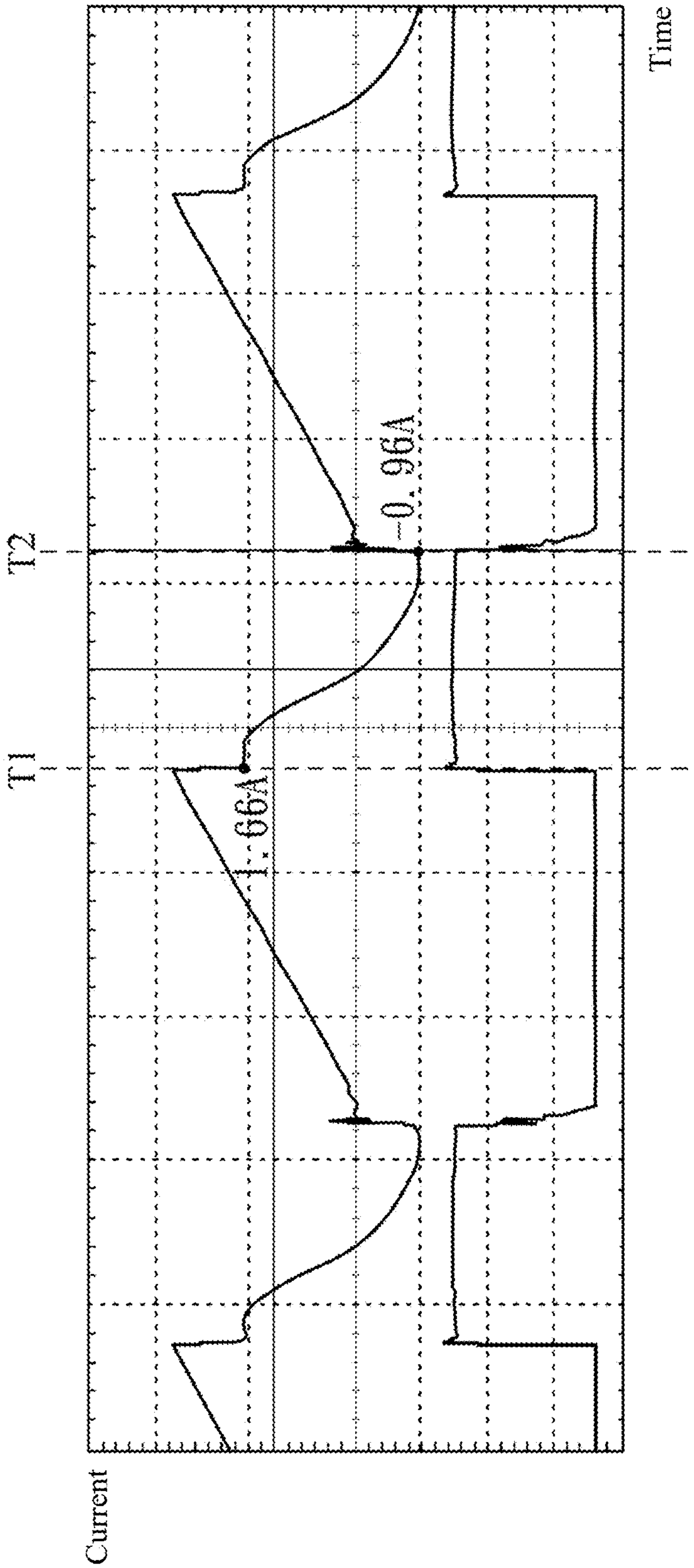
FIG. 6A is a current waveform of a main power end in a comparative example.
Figure 6B:
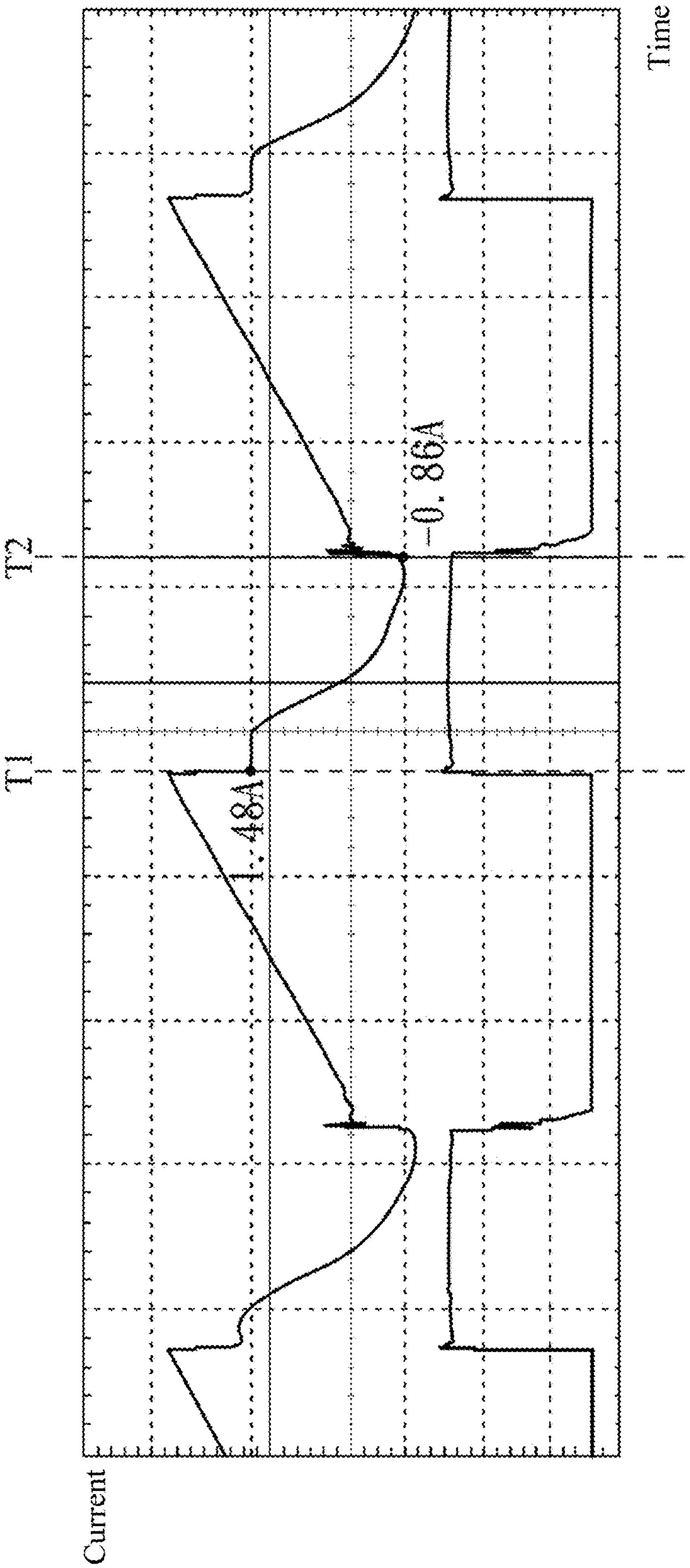
FIG. 6B is a current waveform diagram of a main power end in some embodiments of the present invention.

Please refer to FIG. 6A and FIG. 6B. FIG. 6A is a current waveform of a main power end 116 in a comparative example; and FIG. 6B is a current waveform of a main power end 116 in some embodiments of the present invention. Waveforms of the PWM signal Sn3 are displayed at the bottom in FIG. 6A and FIG. 6B to compare the switching process of the second switch 122. As shown in FIG. 6A, in the comparative example, the negative-voltage is not inputted to the second switch 122 during the dead time of the first switch 114 and the second switch 122 (namely zero voltage is inputted); and in the turn-on period of the second switch 122, the current value of the main power end 116 is changed from 1.66 A to −0.96 A from a time point T1 to a time point T2. As shown in FIG. 6B, according to the embodiment of the present invention, the negative-voltage is inputted to the second switch 122 during the dead time of the first switch 114 and the second switch 122; and in the turn-on period of the second switch 122, the current value of the main power end 116 is changed from 1.48 A to −0.86 A from a time point T1 to a time point T2. Obviously, compared with the comparative example, in the embodiment of the present invention, the excitation current of the primary side is smaller in the energy coupling process, which indicates that more excitation energy of the primary side is coupled to the secondary side coil 120'.

In conclusion, according to the active clamping voltage conversion circuit 100 and the control method thereof according to some embodiments of the present invention, the negative-voltage is transferred to the second switch 122, thereby the voltage of the primary side coil 120 is increased, more excitation energy of the primary side coil 120 can be transferred to the secondary side coil 120', and meanwhile, the excitation energy flowing to the clamping capacitor C2 is reduced so that losses in the energy recycling process can be reduced. Moreover, because the voltage of the primary side coil 120 is increased, it is not needed to additionally arrange the CLC resonant circuit configured to reduce the voltage on the secondary side of the transformer 112. In this way, the hardware cost and the occupied volume of the CLC resonant circuit can be reduced, and the miniaturization of product is facilitated.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An active clamping voltage conversion circuit, comprising:

a switching power supply circuit, comprising a transformer and a first switch, wherein a primary side coil of the transformer has a main power end and a main ground end, and the first switch is coupled to the main ground end of the transformer;

an active clamping circuit, coupled in parallel to the primary side coil of the transformer and comprising a second switch;

a current sensor, coupled between the main ground end of the transformer and the second switch to generate a current detection signal, wherein the current detection signal indicates the current flowing through the second switch;

a PWM controller, coupled to the first switch and generating a PWM signal to the first switch, causing the first switch to perform switching operations; and a positive-negative voltage controller, coupled to the second switch and the current sensor, and selectively outputting a negative-voltage to the second switch according to the current detection signal during a dead time between the first switch and second switch.

2. The active clamping voltage conversion circuit according to claim 1, wherein in response to that the current detection signal is greater than a reference signal, the positive-negative voltage controller outputs the negative-voltage to a control end of the second switch.

3. The active clamping voltage conversion circuit according to claim 1, wherein the positive-negative voltage controller further comprises a positive-negative voltage generator and a comparator, and the positive-negative voltage generator selectively generates the negative-voltage according to a comparison result of the comparator for the current detection signal and a reference signal.

4. The active clamping voltage conversion circuit according to claim 3, wherein the reference signal is 0 ampere.

5. The active clamping voltage conversion circuit according to claim 1, wherein the negative-voltage starts from a start point of the dead time.

6. The active clamping voltage conversion circuit according to claim 1, wherein the positive-negative voltage controller outputs a positive-voltage after finishing outputting the negative-voltage.

7. The active clamping voltage conversion circuit according to claim 1, wherein the value of negative voltage is close to an upper limit of negative voltage tolerance between a gate and a source of the second switch.

8. The active clamping voltage conversion circuit according to claim 1, further comprising a feedback controller which is coupled to a secondary side of the transformer and the PWM controller to transfer a feedback signal of the secondary side to the PWM controller, wherein the PWM controller generates the PWM signal according to the feedback signal.

9. A controller, adapted to control an active clamping voltage conversion circuit, wherein the active clamping voltage conversion circuit comprises a switching power supply circuit having a first switch and an active clamping circuit having a second switch, and the controller is configured to:

generate a PWM signal to the first switch, causing the first switch to perform switching operations;

acquire a current detection signal indicating the current flowing through the second switch; and selectively output a negative-voltage to the second switch according to the current detection signal during a dead time of the first switch and the second switch.

10. The controller according to claim 9, wherein the selectively outputting a negative-voltage to the second switch according to the current detection signal comprises: in response to that the current detection signal is determined to be greater than a reference signal, outputting the negative-voltage to the second switch.

11. The controller according to claim 10, wherein the reference signal is 0 ampere.

12. The controller according to claim 9, wherein the negative voltage starts from a start point of the dead time.

13. The controller according to claim 9, further being configured to output a positive-voltage after finishing outputting the negative-voltage.

14. The controller according to claim 9, wherein the value of the negative voltage is close to an upper limit of negative voltage tolerance between a gate and a source of the second switch.

* * * * *